(12) United States Patent
Klaassen

(10) Patent No.: US 6,567,232 B1
(45) Date of Patent: May 20, 2003

(54) CAPACITIVE VOICE COIL ACTUATOR RETRACT DEVICE WITH CRASH STOP BOUNCE DETECTOR

(75) Inventor: Erno Hilbrand Klaassen, Santa Clara, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/430,212

(22) Filed: Oct. 29, 1999

(51) Int. Cl.[7] .............................................. G11B 21/02
(52) U.S. Cl. ........................................................ 360/75
(58) Field of Search ........................... 360/75; 318/563, 318/561, 280, 678

(56) References Cited

U.S. PATENT DOCUMENTS

| | | | |
|---|---|---|---|
| 4,786,995 A | 11/1988 | Stupeck et al. ................ 360/75 |
| 4,885,517 A | * 12/1989 | Pennock ..................... 318/678 |
| 5,325,030 A | 6/1994 | Yamamura et al. |
| 5,495,156 A | 2/1996 | Wilson et al. .............. 318/368 |
| 5,615,064 A | 3/1997 | Blank et al. |
| 5,663,846 A | 9/1997 | Masuoka et al. |
| 5,969,899 A | * 10/1999 | Utenick et al. .......... 360/78.04 |
| 6,025,968 A | * 2/2000 | Albrecht ....................... 360/75 |
| 6,081,400 A | * 6/2000 | Lu et al. ....................... 360/75 |
| 6,140,784 A | * 10/2000 | Mazda ........................ 318/280 |

* cited by examiner

Primary Examiner—David Hudspeth
Assistant Examiner—K. Wong
(74) Attorney, Agent, or Firm—Lumen Intellectual Property Services, Inc.

(57) ABSTRACT

A self-sufficient electronic device to retract and park a voice coil actuator in a resistive parking position in hard disk drives whose kinetic energy obtained from the rotating disk stack is not sufficient to be utilized as an energy source for the power-off retract and parking of the actuator. The invention uses electric energy stored in one or more capacitors to perform the necessary tasks. An initial electrical pulse is imposed on the actuator to propel the actuator towards a resistive parking ramp. In the event the actuator bounces off a crash stop barrier a bounce detector recognizes a polarity change of a reactive voice coil voltage and gives a signal for a secondary energy pulse to return the bouncing actuator to the resistive parking position. The simple logical concept of the device conserves space and energy making it suitable for miniature hard disk drives.

19 Claims, 5 Drawing Sheets

CAPACITIVE VOICE COIL ACTUATOR RETRACT DEVICE WITH CRASH STOP BOUNCE DETECTOR

FIELD OF THE INVENTION

The present invention relates to the field of power-off actuator retract devices in hard disk drives.

BACKGROUND OF THE INVENTION

Hard disk drives are the most commonly employed data storage devices in personal computers, which are being continuously improved to meet the demand for higher performance. The amount of data to be stored on a hard disk drive is rapidly increasing due to more sophisticated software applications and larger data files. At the same time, personal computers are becoming smaller in size. For example, new types of portable computers known as notebooks and miniaturized desktop computers have been introduced to meet the demands for less space consumption in an office environment.

The reasons described above together with an additional demand for faster access to the data stored on the hard disk drive are forcing the manufacturers to reduce the size of hard disk drives.

A typical hard disk drive includes the following: a number of spinning disks stacked above each other on a spindle, a disk controller, a rotary actuator and an actuator retract circuit. All these elements are mounted in a chassis or housing and supplied with external cable connectors.

The spinning disks have a magnetic recording layer for data storage. The rotary actuator consists of a number of arms equipped with heads for reading and writing data in generally radial and concentric tracks in the recording layers of the individual disks. The actuator is usually driven by an attached voice coil motor(VCM). Flexible cables are connected with the actuator and the controller to transmit signals to and from the heads and to power the VCM. The disk controller is typically an electronic circuit that controls all functions of the hard disk drive.

During regular operation of the drive, the controllers control the actuator motions including the movements to and from a parking position, at which the actuator is placed when the drive is not under operation. However, if the power supply to the drive is shut off unexpectedly, the actuator may not be in the proper parking position. Since the controller requires external power to operate, it cannot park the actuator after unexpected power supply shut-off. An independent retract circuit parks the actuator in such cases.

Such a retract circuit has to be able to power and control the retraction or withdrawal of the actuator from the disk surface into a parking position within a critical time period during which the spinning disks slow down to a minimal rotational speed. The minimal rotational speed guarantees sufficient supporting airflow between the disk surface and an air bearing surface of the read and write heads to keep them at a minimum flying height. In case the supporting airflow should fall beneath a critical value, the heads are likely to crash and damage the disk surface. Moreover, if the heads were to come to rest on the smooth disk surface, they would adhere to the disks through a process known as stiction.

There are two main methods for parking heads during power-off of the disk drive. The first is known as contact start-stop (CSS). In this method, the heads are moved to a special central location of the disks, the so-called landing zone. During the down spinning period of the disks, the supporting airflow decays and the heads land on the landing zone. To prevent stiction between the heads and disks, this landing zone is roughened or textured.

One of the main shortcomings of CSS is wear between the heads and the disks, which is caused by a sliding contact during the landing process. Another problem is that the flying height of heads in modern disk drives is becoming lower than the minimum required surface roughness, such that the heads tend to contact the textured disk surface, while the disks are still rotating at full speed. As a result, the interface is subject to excessive wear.

External imposed mechanical shock causes the heads, parked on the central landing zone to vibrate with the danger of vertically impacting the disk surfaces, an effect commonly known as head slap. Head slap can damage the heads and disks, and can generate particles that could cause the heads to crash.

Another method for parking heads during power-off is to move them to a parking ramp, located at either the inner or outer diameter of the disks. Each head of an actuator is mounted on a suspension. A tab or sliding element is provided at the end of the suspension. The tab is pushed onto the wedge shaped ramp. When the tabs reach the predetermined parking position on the ramp, the actuator is held in place with either a mechanical or an inertial latch. A mechanical latch locks the actuator in place, while an inertial latch engages a mechanism against the actuator when the drive is exposed to mechanical shock or acceleration. This ramp-parking process overcomes some of the shortcomings of CSS parking described above. Since the heads are not sitting on the disk during power-off, they are less prone to damage from external shocks. This is especially important in portable disk drives.

The electrical energy necessary for the retract movement to a parking position and the internal energy consumed by the actuator retract circuit is typically generated by a back electromotive energy generated from the kinetic energy stored in the rotating disk stack. The kinetic energy is thereby converted into a back electromotive voltage (BEMV) by utilizing the disk motor as a generator. The rectified BEMV is electrically connected across the voice coil motor VCM, which generates a torque on the actuator in the desired direction into the parking position. An example of such a retract circuit is described in US. Pat. No. 5,486,957.

As disk drives are made increasingly smaller for portable applications, several design parameters become limiting to the use of spindle motor BEMV for the retract event. The primary demand to save battery power reduces the size and mass of all moving or accelerated parts with the following results: First, the disk drives employ fewer disks of smaller diameter and the disk motors have lower torque constants and a relatively high internal resistance. These parameters reduce the magnitude of the back electromotive voltage that can be obtained from the spinning motor, as well as the total energy that can be extracted to park the actuator. Secondly, the VCM also has a low torque constant and an increased internal resistance due to a reduced wire diameter of the windings. Since the bias force from the actuator cables is not reduced proportionally with the torque constant of the VCM, the minimal required retract energy is higher relative to that in conventional disk drives.

Some parameters become more advantageous, such as the lower moment of inertia of the shorter actuator, and a reduced number of heads with their tabs that have to be moved onto a parking ramp.

Still, the combination of all parameters impose an increase of the demanded retract energy relative to the electric energy that can be extracted from the kinetic energy of the down spinning disk stack.

To overcome these problems in small drives, an alternate approach is to power the retract circuit with energy stored in a capacitor. A combination of both types of energy sources may also be used.

U.S. Pat. No. 4,786,995 to Stupek teaches a retract system for use with a stepper-motor actuator. Energy, for the stepper motor is derived from the back electromotive energy generated from the down-spinning disk stack assisted by a charged capacitor. Highly complicated electronics are used to supply the energy in a number of pulses with a predetermined rate that defines the velocity and the rotational angle of the stepper motor. The stepper motor imposes its controlled rotation over a geared transmission system onto the actuator. The retract system is sophisticated and relies heavily on resistive components, which increase internal energy consumption. Even in hard disk drives equipped with large diameter disks and a relatively large amount of available kinetic energy additional capacitors have to be used to power the electronics and the stepper motor for the retraction and parking. The retract system is not feasible for small hard disk drives that use voice coils.

U.S. Pat. No. 5,325,030 to Yamamura et al. describes the general use of capacitors as possible energy source for a voice coil actuator retract. To initiate the retraction the capacitor is simply connected to the voice coil actuator to provide a single energy pulse. The actuator is accelerated and moves away from the disk surface. A shortcoming of single-pulse type capacitor retract systems is that the actuator may not properly enter and stay in the parking position under all circumstances. At the moment of power-off, the velocity and position of the actuator can vary over the operational range of positions and velocities during the regular usage of the drive. The torque needed to reach the parking position varies widely depending on these initial conditions. With a single pulse retract, without any adjustment for initial conditions, a predetermined torque pulse is applied to the actuator regardless of initial conditions. In some situations the torque pulse may be too large, such that the actuator bounces out of the parking position, which results in drive failure.

U.S. Pat. No. 5,495,156 to Wilson et al. discloses an actuator retraction circuit that uses the back electromotive energy generated from a down spinning disk stack to move the actuator into a parking position. The velocity of the actuator in or against retraction direction at the beginning of the retraction event generates an electromotive voltage, which is utilized to adjust the amount of energy imposed in an initial energy pulse onto an actuator motor. The invention sufficiently compensates the velocity differences of the actuator at the beginning of the retraction event to park the actuator with a predetermined end velocity.

Because of the sophistication of the circuit with its reliance on resistors its internal energy consumption is too high to utilize it in very small disk drives. The disclosed invention is also only designed to impose most of its energy in an initial impulse leaving no energy reserves for the moment when the actuator reaches the ramp to ensure the proper retention in the predetermined parking position.

U.S. Pat. No. 5,615,064 to Blank et al. and U.S. Pat. No. 5,663,846 to Masuoka and Toru describe actuator control systems that use a back electromotive voltage from the actuator motor as a control signal during regular operation of the hard disk drive. The hard disk drive has an external energy supply. The control signal is processed together with other derived parameters within the hard disk controller for a regular operational retraction. The back electromotive voltage is changed into a control signal with a relative high energetic expenditure. The disclosed inventions are thus not useful for a power-off retract circuit with a very limited energy supply derived from capacitors.

A further shortcoming of capacitive retract systems is that they require physically large and expensive capacitors to store energy to power the retract. In a very small drive, such as a 1-inch drive in a CompactFlash form factor, it is challenging to budget enough space for a large capacitor. Since single-pulse capacitive retract circuits are inefficient in their conversion of stored energy into mechanical energy of the rotary actuator, the capacitors have to be larger than necessary.

Therefore, there exists a need for an actuator retract circuit with a low internal energy consumption and a highly efficient distribution of the available energy to retract an actuator from its operational position over a disk into a fixed parking position. The current invention addresses this need.

OBJECTS AND ADVANTAGES

Accordingly, it is a primary object of the present invention to provide an energetically self-sufficient electronic device to power an initial retraction and a final positioning onto a resistive parking ramp of a voice coil actuator.

It is a further object of the present invention to provide an energetically self-sufficient electronic device with an internal energy consumption sufficiently low to keep the required capacitor size to a minimum.

SUMMARY OF THE INVENTION

The objects and advantages of the invention are achieved by a self-sufficient electronic device for retracting and parking a voice coil actuator onto a resistive parking ramp. The device is preferably used in miniaturized hard disk drives, in which the kinetic energy of the rotating disk stack is not sufficient to be utilized as the energy source for the power-off retract and parking of the actuator. The invention therefore provides a simplified electronic circuit with low internal energy consumption that uses electric energy stored in one or more capacitors to perform the necessary tasks.

An initiation signal received by the device can be an operational signal from the computer or an internally generated signal resulting from a power loss in the computer. This initiation signal initiates a predetermined primary energy pulse to be applied from a capacitor to the voice coil actuator.

The voice coil actuator has an operational velocity range defined by a maximum velocity toward and away from a resistive parking ramp adjacent to the disk stack. After application of the primary energy pulse, the retraction velocity of the actuator depends on the operational velocity immediately prior to the application of the primary energy pulse. Other factors influencing the retraction velocity are mainly related to the flex bias of supply cables of the actuator and an actuator torque constant.

The retract velocity varies between a value sufficient to have the actuator reach the resistive parking ramp from the most distant position, and a maximum value that causes the actuator to bounce off a crash stop on the ramp and jump back onto the disk surface. The crash stop is a physical barrier that prevents the actuator from moving past the end of the parking ramp and typically contacts the back of the actuator.

The inventive device in the preferred embodiment monitors the polarity of the back electromotive voltage in the voice coil actuator after application of the primary energy pulse. A change of polarity is an indication that the actuator is bouncing off the crash stop. The polarity change is therefore utilized as a secondary initiation signal for applying a secondary energy pulse to urge an off-bouncing actuator back towards the crash stop and retain it on the resistive parking ramp.

The invention in a second embodiment monitors the back electromotive voltage in the voice coil actuator. The absence of back electromotive voltage is an indication that the actuator has stopped on the resistive parking ramp. The absence of back electromotive voltage is therefore utilized as the secondary initiation signal for the secondary energy pulse. The secondary energy pulse is applied to the actuator to press it against the crash stop as a regular operational step during the retraction.

The electronic device of the invention presents a simple logical concept and has small demand for information gathering and processing. These features make the inventive device space and energy efficient, and hence suitable for use in miniaturized hard disk drives.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments are set forth without any loss of generality to, and without imposing limitations upon, the claimed invention.

Figure 1:
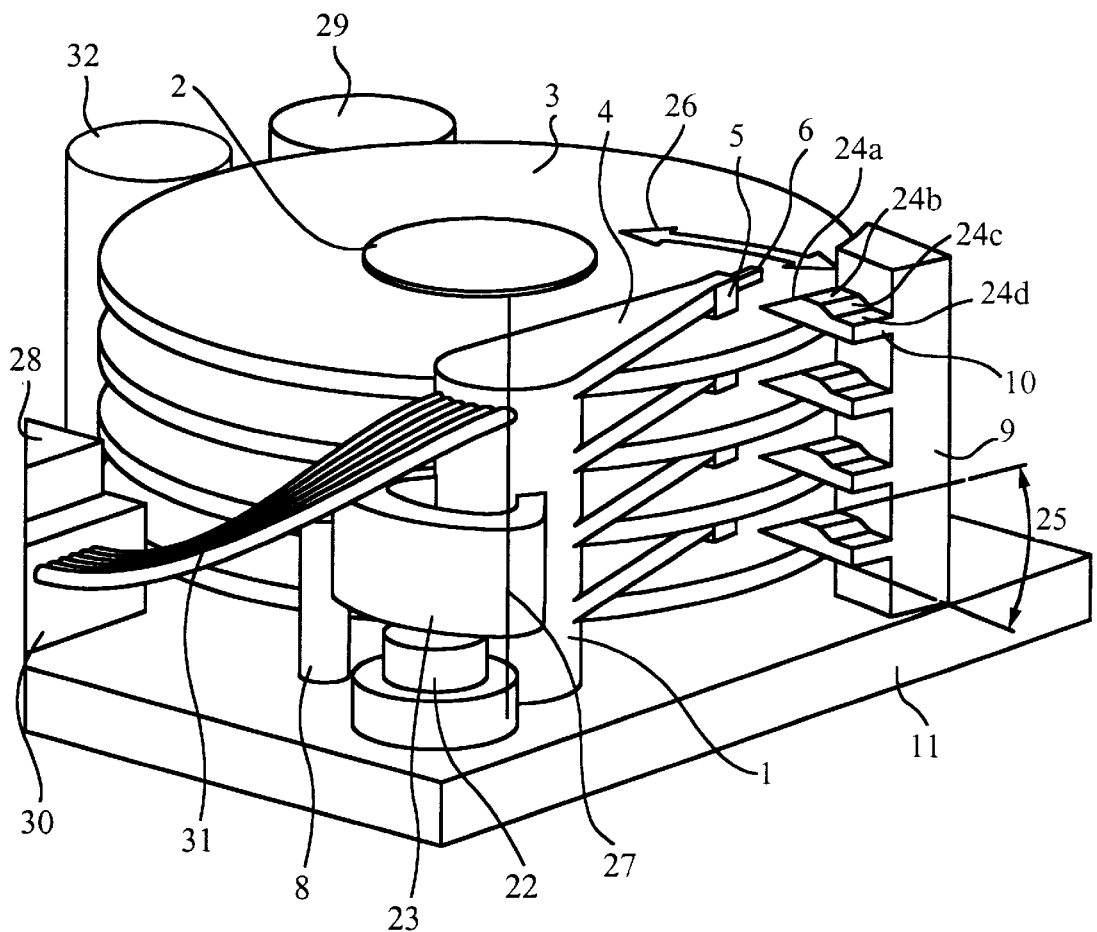
FIG. 1 shows a fragmental perspective view of a simplified hard disk drive.

FIG. 1 shows a fragmental perspective view of a simplified hard disk drive with an array of parking ramps 10 on a ramp block 9 as an example of a parking ramp structure. A chassis base 11 carries an actuator 1 with a number of actuator arms 4, each of them carrying one or two read and write heads 5 and a friction contact 6. Each read and write head 5 is held in close flying height to one disk surface 3 of the disk stack 2. A voice coil motor shown in FIG. 1 works according to the principle of a moving coil-motor. The voice coil 23 as the moving part is thus attached to the actuator 1. A magnet assembly 22 is mounted on the chassis base 11. A current applied by a controller through voice coil 23 in the magnetic field of magnet assembly 22 results in a force on the voice coil 23 and a torque on the actuator 1. The voice coil 23 has inductance; as a result, whenever a current is applied to voice coil 23, a certain energy is stored in the form of an additional magnetic field eminating from the voice coil 23. When the voice coil 23 moves through the magnetic field from magnet 22, across voice coil 23 a back electromotive voltage develops, which is proportional to the angular velocity of actuator 1.

This stored energy is utilized in the present invention by simultaneously disconnecting the OV and shorting the voice coil 23. The stored energy is then consumed while creating a mechanical torque on the actuator 1. The efficiency of this process depends on an end-voltage, at which the voice coil 23 is opened again. The efficiency is at the highest level, when the voice coil 23 remains shorted exactly to the moment when the end-current reaches zero. If the voice coil 23 remains shorted beyond that moment, the Vbemf of the moving actuator brakes the previously accelerated actuator 1 by generating a current in the opposite direction.

During regular operation the disk stack 2 spins at a predetermined rotational speed. The read and write head 5 has an air bearing surface which flies on the air film and keeps the read and write head 5 at a constant height above the disk surface 3.

During regular operational shut down of a computer, the voice coil 23 moves the actuator 1 with the attached friction tabs 6 to a parking ramp 10, which consists, in the example shown in FIG. 1, of the following: an inclining portion 24a, a flat section 24b, a downhill section 24c and a flat parking area 24d. The parking ramp 10 extends onto the disk surface 3 such that each retracting read and write head 5 is lifted out of it's movement plane 26. During the operational retraction each friction tabs 6 glides along the flat section 24b and the downhill section 24c into the flat parking area. It is appreciated that anybody skilled in the art may vary the appearance of the parking ramp 10 without diverting from the core of the invention.

A crash stop pin 8 is positioned within the movement range of the voice coil 23 on the chassis base 11 to prevent further movement of the actuator 1 which would force the lift tabs 6 beyond the flat parking area 24d. To avoid a situation where the actuator 1 is pushed out of the parking position from a peripheral induced shock impulse such that it might land on the disk surface, it has to be secured onto the flat parking area 24d. Two types of latches are typically used for this purpose:

1) a passive mechanical latch, in which the actuator arm 4 has to be pushed with a significant amount of torque to engage with a snapping mechanism belonging to this latch,
2) an inertia latch, which -is initiated only by an externally induced shock, whereby the actuator arm 4 or the side of the actuator 1 at the voice coil 23 is grabbed and secured in the parking position. The inertia latch is energetically independent from the retract event, which makes it preferable in combination with low energy consuming emergency retract devices. The inertia latch has a certain grabbing range within which the actuator arm 4 has to be parked.

In an emergency situation, e.g., when the functioning of the computer is interrupted, or when the power supply level changes beyond acceptable limits, an emergency retract command is issued by the computer or by an emergency retract circuit 28 which recognizes the power level change of the power supply. Energy stored in a preferably primary capacitor 29 during the regular operation of the hard disk is then transmitted in a primary energy pulse to the voice coil 23, to generate a torque in the voice coil 23 accelerating the actuator 1 towards the parking position.

One of the goals of the invention is to keep the design simple and keep internal energy consumption as low as possible. The primary capacitor. 29 is dimensioned to provide a predetermined energy amount to overcome a several opposing forces and factors. These are mainly a flex bias of supply cables 31 running from the hard disk controller 30 to the actuator 1, mechanical friction resistance in the joints of the actuator 1, a varying position of the actuator 1, a varying velocity of the actuator 1 at the beginning of the emergency retraction, electrical resistance in the voice coil 23, friction of lift tabs 6 on the ramps and pull down force on heads from air bearing surface.

Figure 2:
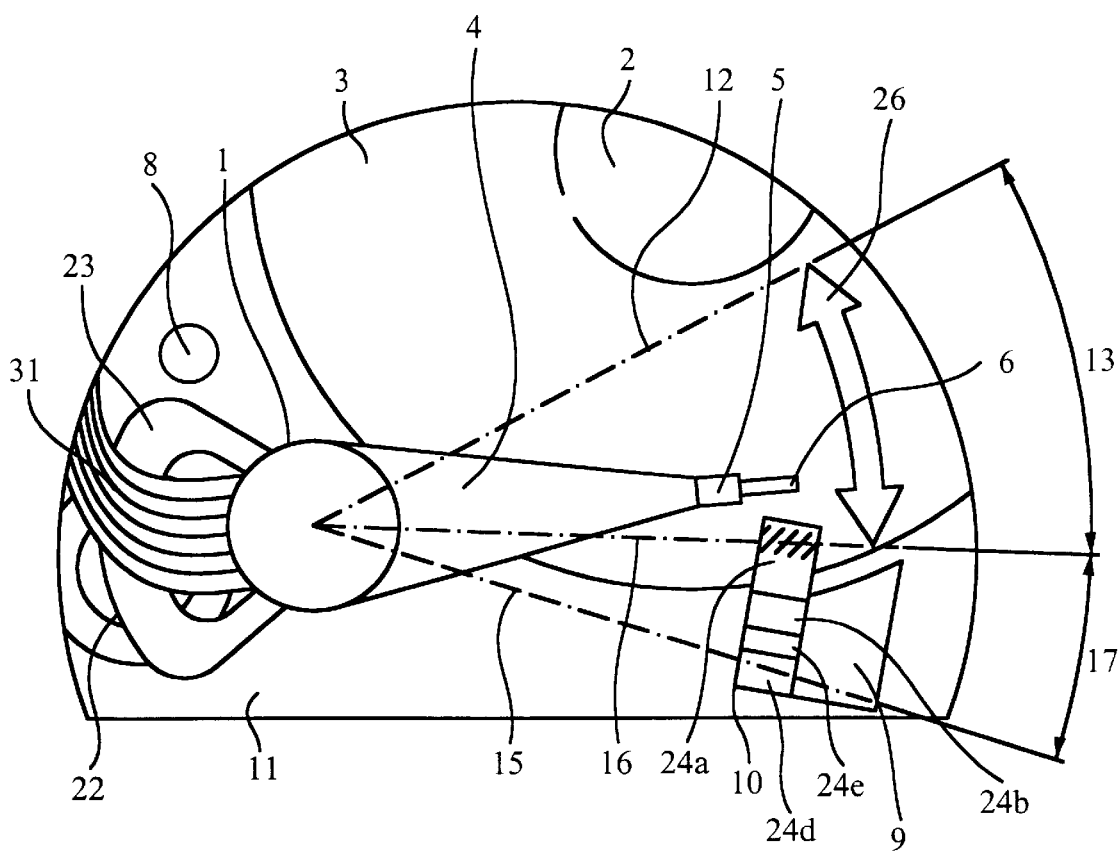
FIG. 2 shows a fragmental schematic view of a simplified hard disk drive.

FIG. 2 shows a schematic fractional top view of an example of an parking ramp structure consisting of the same exemplary components as shown in FIG. 1. Further shown are an inner actuator range limit 12 and a friction surface contact point 16 defining an angular operation range 13 within which the actuator 1 moves at various velocities during read and write operation. A parking position 15 and the friction surface contact point 16 define the beginning of friction breaking range 17. Breaking range 17 has an angular extent, which corresponds to the friction or breaking path.

The initial energy pulse is applied to the actuator 1, which at this time is moving at an unknown velocity at an unknown location within the operation range 13. The actuator 1 experiences a torque which causes it to move towards the parking position 15 at the crash stop 8 at a retract velocity. The value of the retract velocity of the actuator 1 at the friction surface contact point 16 varies between a low range limit and a high range limit. These limits are defined by the varying opposing forces and factors as described under FIG. 1. The low range limit is equivalent to a kinetic energy stored in the actuator 1 and is at least equal to the friction energy consumed by the friction path (as described under FIG. 1). In this case the actuator 1 reaches the parking position 15 at zero velocity.

The primary energy pulse is calculated to ensure that the retract velocity is at least equal to the low range limit. A low opposing force at the beginning of the retraction is a result of the actuator 1 moving in direction of the parking position 15 with a high operational velocity already when the initial energy pulse is applied. In this situation, the primary energy pulse adds to the high operational velocity an additional acceleration and defines thereby a high range limit. The high range limit corresponds to a high level of kinetic energy of the actuator 1. Specifically, this kinetic energy is significantly bigger than the friction energy consumed by decelerating the actuator 1 along the friction path. The actuator 1 thereby contacts the crash stop 8 with a remaining kinetic energy, which is absorbed through elastic deformation or compression of the crash stop material 6. Immediately thereafter the crash stop uncompresses, causing the actuator 1 to bounce back.

At the moment the actuator 1 is brought to a halt at the crash stop 8, the back electromotive voltage in the voice coil. 23 reaches zero. Then it increases again due to a change in polarity corresponding to the reverse direction of motion of the back bouncing actuator 1. In the preferred embodiment a polarity detector is provided to recognize this polarity reversal of the back electromotive voltage and to initiate a secondary energy pulse.

The secondary energy pulse is powered from a preferably secondary capacitor 32. The application of the secondary energy pulse accelerates the actuator 1 again towards the crash stop 8 and pressing it against the crash stop 8. Most preferably, the drain characteristic of the secondary capacitor 32 is adjusted to provide for a time delayed decay of the actuator torque against the crash stop 8. This permits the friction contact 6 to slowly release the stress due to resilient deformation experienced due to contact with the crash stop 8. After the energy has drained from the secondary capacitor 32 the actuator 1 has no kinetic energy left and is thus retained at the resistive parking position 15. In the preferred embodiment the secondary energy pulse is initiated only in case of rebound of the actuator 1 from crash stop 8.

In another embodiment a value detector initiates the secondary energy pulse by detecting the back electromotive voltage reaching zero. This happens when the actuator 1 stops at the resistive parking position 15 or when it hits the crash stop 8.

In this alternative embodiment the initiation of the secondary energy pulse is a regular step during the retraction. Eventual loss of the retraction velocity of the actuator 1 before reaching the resistive parking position 15 is thereby also recognized and used to initiate the secondary energy pulse. The secondary capacitor 32 is preferably dimensioned to provide a predetermined energy for the second energy pulse.

Figure 3:
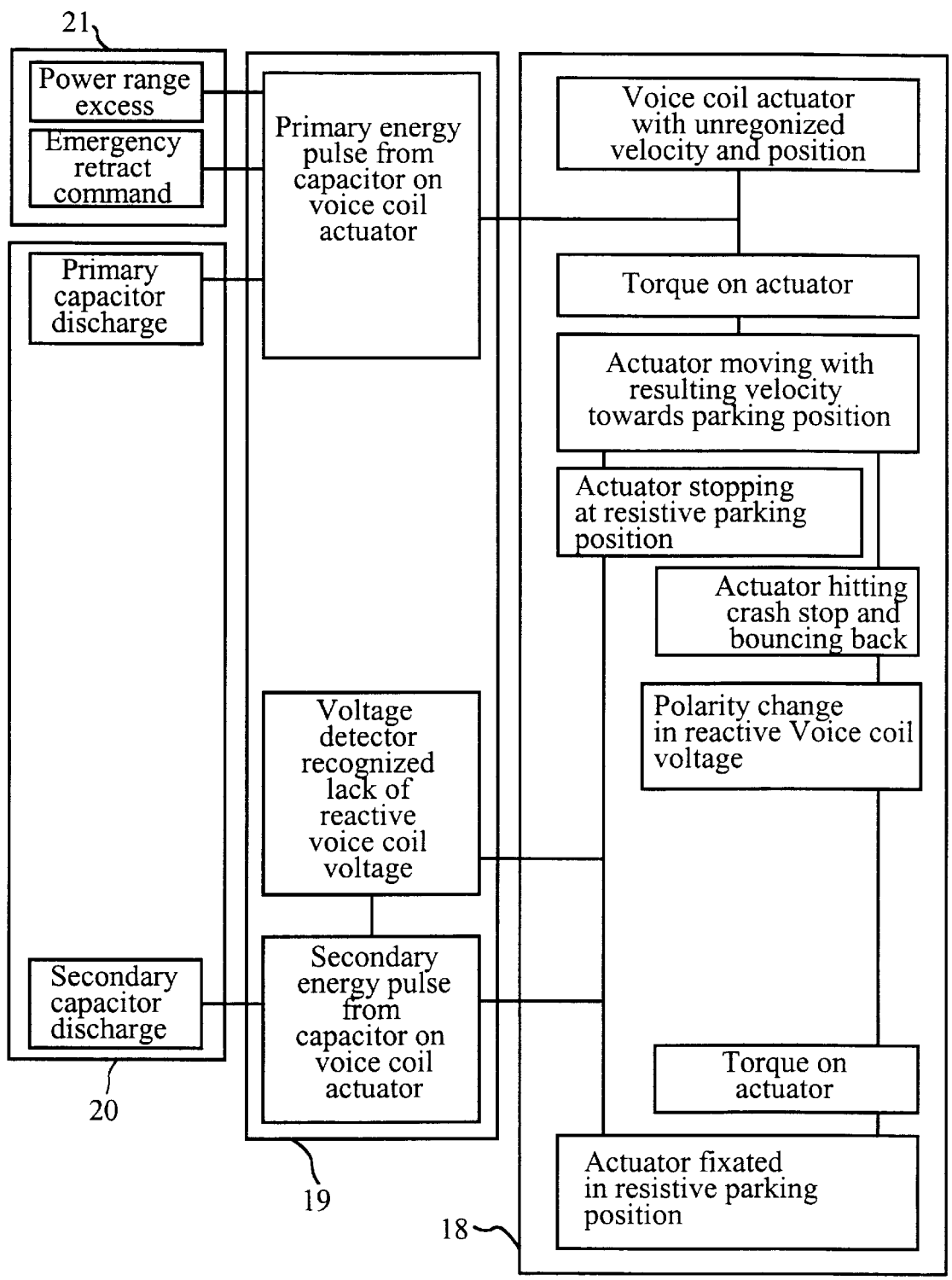
FIG. 3 shows a chronological event diagram of the preferred embodiment of the invention.

FIG. 3 shows a chronological event diagram of the preferred embodiment, where the time flow is represented by: the direction from the top to the bottom of the diagram. An actuator event frame 18 shows all event variations of the actuator 1.

The event diagram shows in particular that the second energy pulse is only initiated if the actuator bounces off the crash stop 8 (see FIG. 1 and FIG. 2). The circuit event frame 19 shows the events initiated by the electronic circuit, and visualizes the logical concepts behind its design.

The capacitor event frame 20 shows a time delay between the drain of the preferably primary and secondary capacitor 29, 32 (see FIG. 1 and FIG. 2). The time delay is significantly bigger than the drain time of each individual capacitor. FIG. 3 shows how the logical concept of the invention resolves the need for time delayed energy supply for the actuator retract in a simple and energetically economical way.

An initiation event frame 21 shows the two conditions that trigger the operation of the invention.

Figure 4:
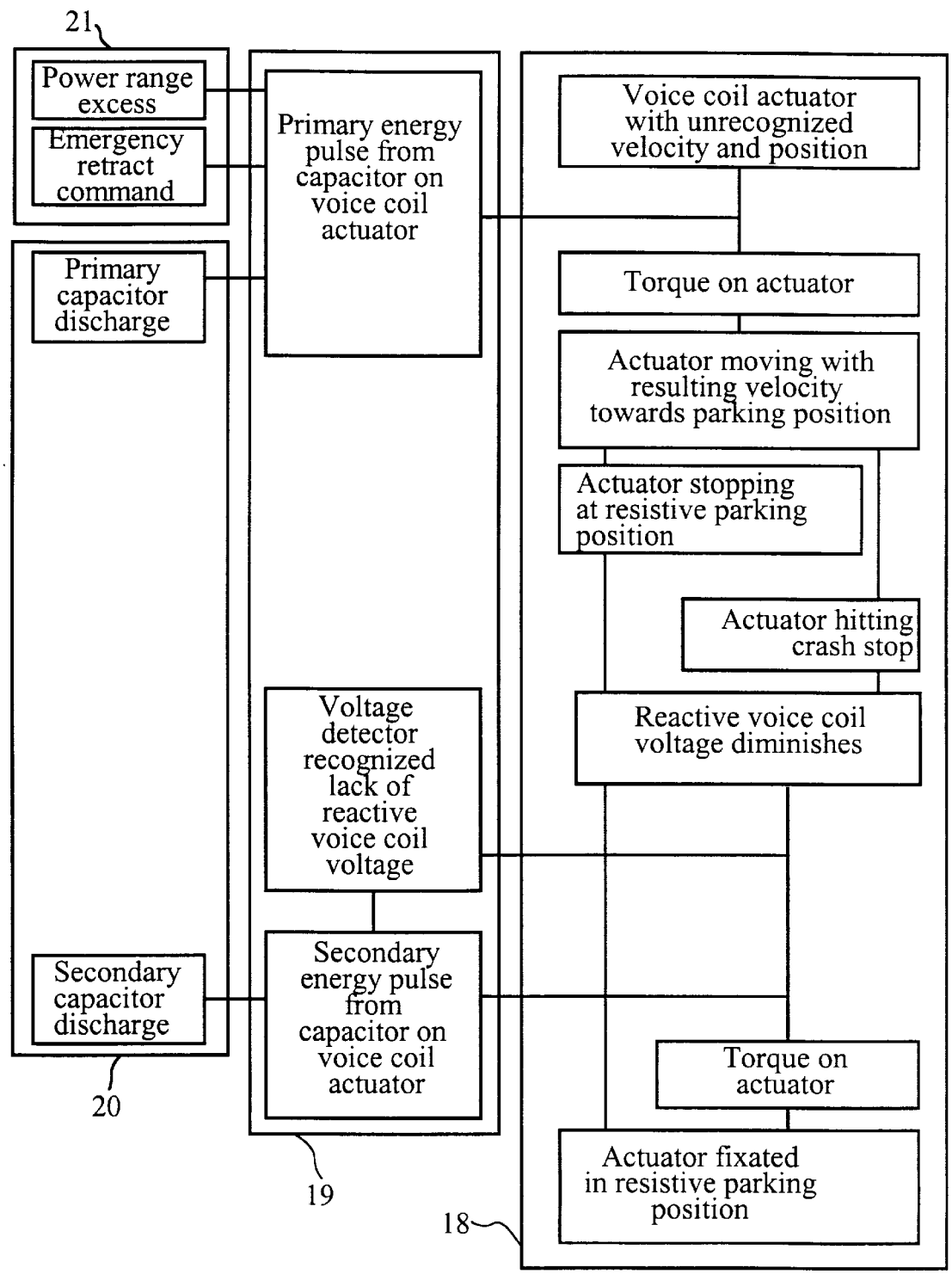
FIG. 4 shows a chronological event diagram of a second embodiment of the invention.

FIG. 4 shows a chronological event diagram of the second embodiment as described under FIG. 3. The difference is that the secondary energy pulse is initiated as part of the regular retraction.

Figure 5:
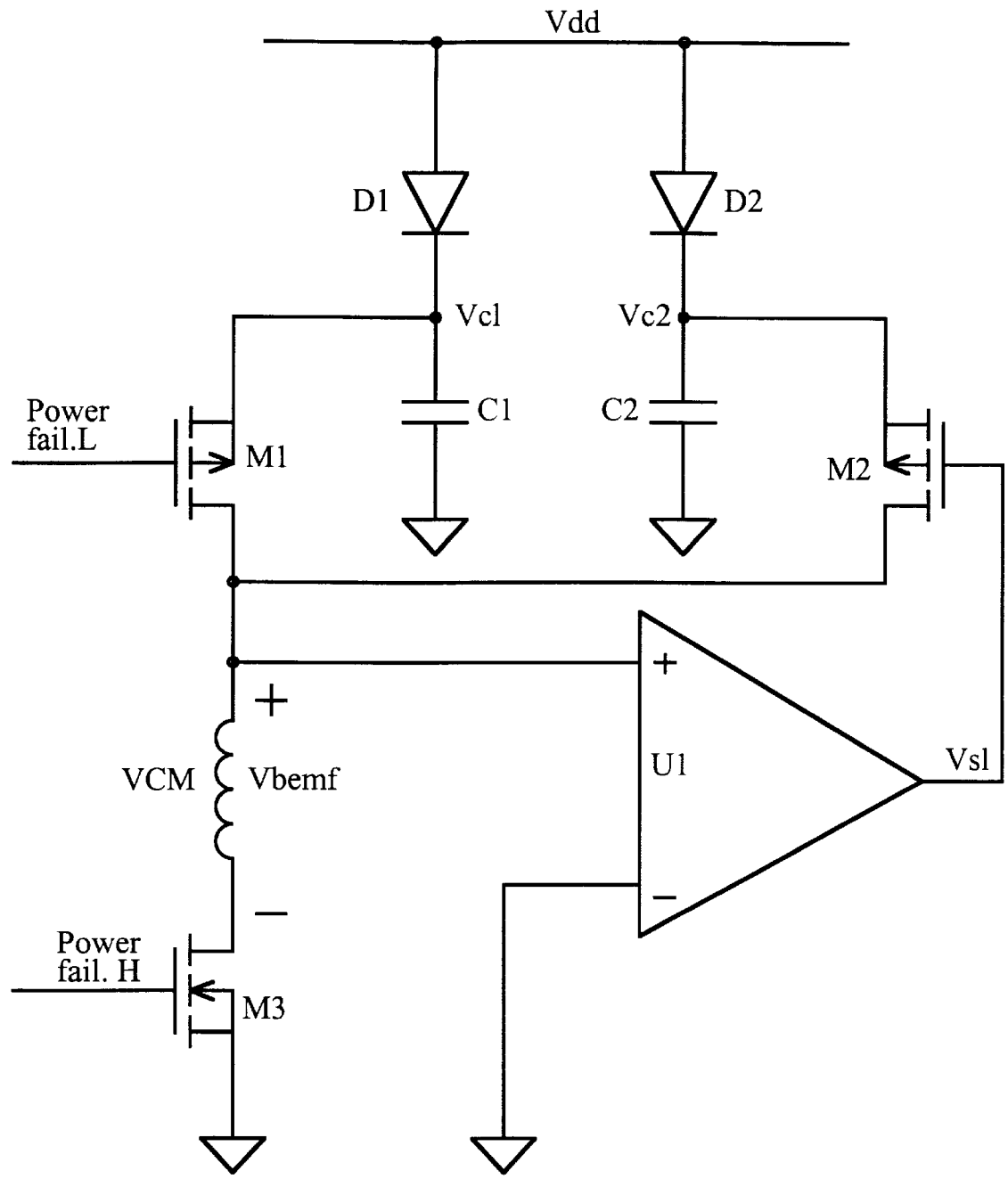
FIG. 5 shows a simplified electric circuit of the preferred embodiment of the invention.

FIG. 5 shows a simplified electronic circuit of the preferred embodiment to demonstrate the main functional principle of the invention. Additional circuit elements necessary to compensate specific characteristics of the involved components are not shown in this figure. A person of average skill in the art will know how to add any further electronic components to optimize circuit operation in accordance with standard electronics techniques.

The retract command or the power range excess is responded to by the circuit by having Power-fail.L going low and Power-fail.H going high. This causes the transistors M1 and M3 to turn on, and energy flows in the form of the primary current pulse from the primary capacitor C1 through the VCM coil. Following the primary energy pulse the actuator 1 travels towards the resistive parking position 15 and generates in the coil of the VCM a back electromotive voltage, with a positive polarity on the side of primary capacitor C1.

While the actuator 1 stops on the resistive parking position 15 at the crash stop 8, Vc1 decays below a threshold voltage of M1, turning off M1 and changing the top of the VCM at the drain of M1 into a high-resistance node. At that moment, the back electromotive voltage is sensed by the polarity detector in the preferred form of a comparator U1. Comparator U1 produces a low output signal Vsl as a result of the comparison of the ground point with Vbemf changing polarity. Vsl turns on the transistor M2 and the secondary capacitor C2 discharges through the VCM in a secondary energy pulse. Diodes D1 and D2 disconnect C1 and C2 from a supply line Vdd, which charges the capacitors during regular operation of the hard disk drive.

In the second embodiment of the invention, the comparator U1 produces the low output signal Vsl at the moment when Vbemf reaches zero.

An additional exemplary implementation of the invention is that when comparator U1 turns on M2 to make the positive side of the VCM again positive. This causes the comparator output to go high again, which would turn M2 off. To prevent that the current flow from capacitor C2 through the VCM stops, following techniques as known to those skilled in the art can be used:
1) designing the output stage in U1 to provide a very slow rise-time, but maintain a fast fall-time,
2) introducing a latching circuit between the output of U1 and M2,
3) introducing a delay circuit between the output of U1 and M2 that allows the gate voltage of M2 to fall rapidly but rise only slowly (slower than the discharge time of C2)

In a second embodiment of the invention only one capacitor C1 is utilized. In this case, D2 and C2 do not exist and Vc2 is at the node of Vc1. M1 is a timed switch as it is known to those skilled in the art to partially discharge C1 for the initial retraction.

Accordingly, the scope of the invention should be determined by the following claims and their legal equivalents:

What is claimed is:

1. A self-sufficient electronic device for powering an initial retraction and a final positioning of a voice coil actuator onto a resistive parking ramp, the self-sufficient electronic device comprising:
   an initiation means to initiate said initial retraction;
   a primary capacitor coupled to said voice coil actuator for powering said initial retraction of said voice coil actuator in response to said initiation means initiating said initial retraction; and
   a secondary capacitor coupled to said voice coil actuator and responsive to a back electromotive voltage of said voice coil-actuator for powering said final positioning of said voice coil actuator, said back electromotive voltage of said voice coil actuator being proportional to a velocity of said voice coil actuator during said initial retraction; wherein said primary capacitor and said secondary capacitor are the sole source of retract power to said voice coil actuator.

2. The electronic device of claim 1, wherein said secondary capacitor is responsive to a polarity of said back electromotive voltage.

3. The electronic device of claim 1, wherein said secondary capacitor is responsive to said back electromotive voltage decreasing to substantially zero.

4. The electronic device of claim 1, wherein said initiation means is responsive to a predetermined condition of a power supply of a disk drive.

5. The electronic device of claim 1, wherein said initiation means is activated by an activation signal derived from a peripheral control unit.

6. The electronic device of claim 1, wherein said secondary capacitor is responsive to bouncing of said voice coil actuator from a crash stop.

7. The electronic device of claim 6, wherein a secondary energy pulse is initiated in responsive to rebound of said voice coil actuator from said crash stop.

8. The electronic device of claim 1, wherein said primary capacitor has a primary capacitance value for storing a predetermined primary energy to power said initial retraction.

9. The electronic device of claim 7, wherein application of said energy pulse powered by said secondary capacitor accelerates said voice coil actuator towards said crash stop, pressing said voice coil actuator against said crash stop.

10. The electronic device of claim 1, wherein said secondary capacitor has a secondary capacitance value for storing a predetermined secondary energy to power said final positioning.

11. The electronic device of claim 1, further comprises an electrically low resistive control circuit for controlling said primary capacitor and said secondary capacitor.

12. The electronic device of claim 9, wherein a drain characteristic of said secondary capacitor is adjusted to provide for a time delayed decay of a torque of said voice coil actuator against said crash stop.

13. The electronic device of claim 1, further comprises a polarity detector for detecting polarity of said back electromotive voltage.

14. The electronic device of claim 13, wherein said polarity detector initiates said final positioning.

15. The electronic device of claim 1, further comprises a value detector for detecting value of said back electromotive voltage.

16. The electronic device of claim 15, wherein said value detector initiates said final positioning.

17. A data recording disk drive, comprising:
   a rotatable disk for recording data;
   a head for writing data to or reading data from the rotatable disk;
   a ramp for parking the head away from the rotatable disk when the rotatable disk is not rotating;
   a voice coil actuator for moving the head across the rotatable disk;
   an actuator arm connecting the head to the voice coil actuator;
   a friction tab attached to the actuator arm for engagement with the ramp;
   a crash stop for limiting movement of the voice coil actuator; and
   a self-sufficient actuator retraction circuitry for powering an initial retraction and final positioning of the voice coil actuator with the friction tab on the ramp, the self-sufficient actuator retraction circuitry comprising:
      an initiation means to initiate the initial retraction;
      a primary capacitor coupled to the voice coil actuator for powering the initial retraction of the voice coil actuator in response to the initiation means initiating the initial retraction; and
      a secondary capacitor coupled to the voice coil actuator and responsive to a back electromotive voltage of the voice coil actuator for powering the final positioning of the voice coil actuator, the back electromotive voltage of the voice coil actuator being proportional to a velocity of the voice coil actuator during the initial retraction; wherein said primary capacitor and said secondary capacitor are the sole source of retract power to said voice coil actuator.

18. The data recording disk drive of claim 17, wherein the secondary capacitor is responsive to a change in polarity of the back electromotive voltage, the voltage polarity change representing rebound movement of the voice coil actuator after striking the crash stop.

19. The data recording disk drive of claim 17, wherein the secondary capacitor is responsive to the back electromotive voltage decreasing to substantially zero, the substantially zero voltage representing positioning of the voice coil actuator at the crash stop.

* * * * *